H. BROOKER.
WORK AND TOOL HOLDER.
APPLICATION FILED NOV. 30, 1918.
1,367,014. Patented Feb. 1, 1921.
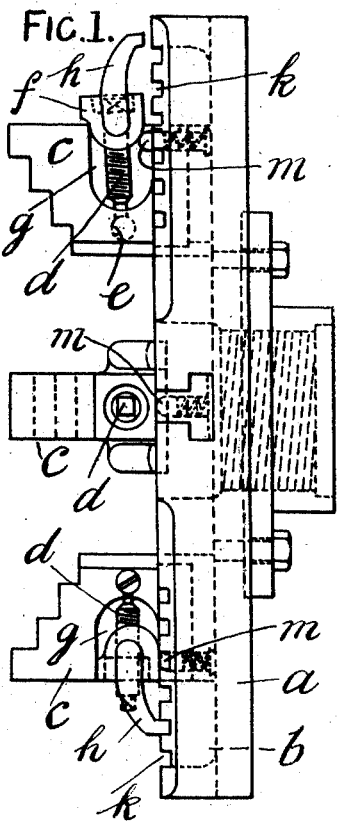
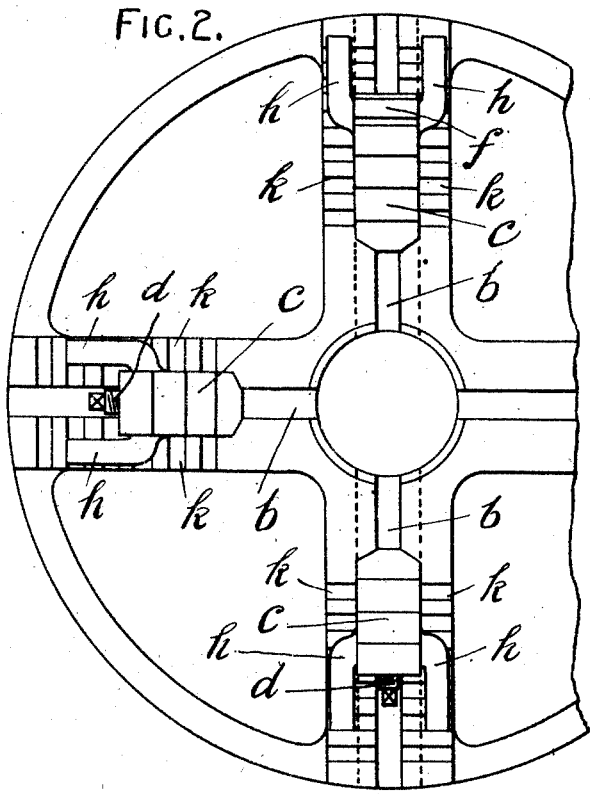
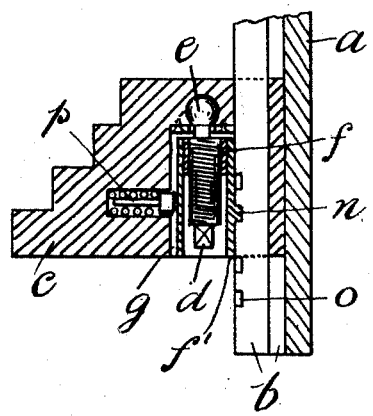
INVENTOR
Henry Brooker
BY H. C. Heide
ATTORNEY

UNITED STATES PATENT OFFICE.

HENRY BROOKER, OF LONDON, ENGLAND.

WORK AND TOOL HOLDER.

1,367,014. Specification of Letters Patent. Patented Feb. 1, 1921.

Application filed November 30, 1918. Serial No. 264,810.

*To all whom it may concern:*

Be it known that I, HENRY BROOKER, a subject of the King of Great Britain, residing at London, England, have invented certain new and useful Improvements in Work and Tool Holders, of which the following is a specification.

This invention relates to improvements in jaw chucks or adjustable work and tool holders for lathes, drilling machines and the like, and is broadly of the class in which a movable jaw is adjustable on a guide in a face plate, means being provided upon the jaw for engaging racks on the face plate whereby the jaw is clamped or locked to the face plate. Screw means mounted in the aforesaid clamping means enable the loose jaw to be tightened up against a piece of work.

Among the objects of the invention are to provide an improved jaw chuck or adjustable work and tool holder for lathes, drilling machines and the like, whereby manufacturing economies are promoted, the fixing of the work or tools facilitated, and the jaws made readily renewable.

Thus under the present invention locking engagement between the locking member and the face plate is insured under all working conditions, as the means for opposing disengagement of the locking member from the face plate are so inter-related with the jaw that accidental release cannot take place or is made very difficult. Further under the present invention by the positive connection existing between the jaw and the thrust member, the to and fro movement of the jaw is positive with or completely dependent on the motion of the thrust member. Thus fine radial or linear adjustment of the jaw both toward and away from the work is provided for. In an embodiment of the invention which posesses the advantages of compactness and structural strength an abutment on the jaw and an abutment on the locking member coöperate to oppose the tendency to flexure of the back of the jaw due to the thrust imparted thereto by the clamping of the work as well as opposing disengagement of the locking member from the face plate.

In order that the present invention may be more clearly understood, reference will hereinafter be made to the accompanying drawings, showing two convenient forms of the improved jaw chuck by way of example.

Figure 1 is a side view and Fig. 2 a fragmentary front view of one form of the jaw chuck, showing one of the jaws out of engagement.

Fig. 3 is a sectional view through a modified form of jaw chuck.

As shown in Figs. 1 and 2 of the drawings the jaw chuck comprises a face plate $a$ having radial T-shaped or other guides $b$ adapted to engage an appropriately formed jaw $c$. The means for radial adjustment of the jaw comprises a thrust member in the form of a screw $d$ pivoted to the jaw at $e$ and working in a locking member or nut $f$ which forms the part adapted to be fixed to the face plate $a$.

The back or outer part of the jaw has a gap or recess $g$ for the reception of the nut $f$ which is adapted to slide in or out of the gap $g$ when the screw $d$ is rotated, the screw being adapted for the reception of a suitable key and being swiveled at $e$ by a ball and socket or other appropriate swivel attachment to enable the screw $d$ to be rotated. As shown in Fig. 1 the wall of the gap $g$ may form an abutment coöperating with an abutment on the nut $f$ to oppose tendency to flexure of the back of the jaw due to the thrust imparted thereto by the clamping of the work.

The nut $f$ is provided with locking means, for example, dog-pieces $h$ adapted to engage racks $k$ along each side of the radial slot $b$, the teeth of the rack alternating with flat faces upon which the jaw may ride. The racks and dog-pieces are made so as to accommodate the thrust in either direction, according to whether the work is held from within or without.

The swivel-attachment $e$ allows the nut $f$ to be hinged away from the face plate $a$ sufficiently to allow the jaw and nut to be moved along the radial guide $b$ to the desired locking position.

The jaw $c$ may be provided with spring-plungers $m$ or other means adapted to raise the nut $f$ when the latter is moved out of the gap $g$, thus raising the dog-pieces $h$ clear off the racks $k$ and allowing the jaw to be moved to any desired position.

In the alternative construction according to Fig. 3, the nut $f$ is fixed in a block $f'$ having a locking rib $n$ engaging grooves $o$ in the face plate $a$, the block $f'$ being pressed into contact with the face plate by a spring-plunger or like device $p$. The grooves $o$ may be slightly undercut and the rib $n$ correspondingly shaped but made slightly narrower to enter the groove and prevent the jaw from forcible displacement when the chuck is in use.

The jaw chuck may be provided with one or more fixed jaws and one or more movable jaws, the latter being constructed substantially as hereinbefore described.

What I claim is:—

1. In a work or tool holder, a face plate, guides on the face plate, a jaw movable on said guides, a thrust member pivoted to said jaw, a locking member on said thrust member adapted when the thrust member is swung down to make locking engagement with the face plate, means shiftable into and out of operative engagement with the jaw, opposing disengagement of said locking member from the face plate, the jaw being adjustable with reference to the locking member, both the to and fro adjustment of which jaw is positive with or directly controlled by the thrust member.

2. In a work or tool holder, a face plate, guides on the face plate, a jaw movable on said guides, a thrust member pivoted to said jaw, a locking member on said thrust member adapted when the thrust member is swung down to make locking engagement with the face plate, an abutment on the jaw coöperating with an abutment on the locking member when in operative engagement for opposing disengagement of said locking member from the face plate, the jaw being adjustable with reference to the locking member, both the to and fro adjustment of which jaw is positive with or directly controlled by the thrust member.

3. In a work or tool holder, a face plate, guides on the face plate, a jaw movable on said guides, a gap in the back of said jaw, a screwed thrust member pivoted on said jaw, a nut threaded on said screwed member and adapted to slide in and out of said gap, racks on said face plate, dog pieces fixed on said nut adapted to engage said racks when the thrust member is swung down, and an abutment on the jaw coöperating with an abutment on the nut when in operative engagement for opposing disengagement of said dog pieces from the face plate, the jaw being adjustable with reference to the nut, both the to and fro adjustment of which jaw is positive with or directly controlled by the thrust member.

4. In a work or tool holder as claimed in claim 3 hereof the arrangement of nut and dog-pieces as a one-piece structure, substantially as described.

5. In a work or tool holder, a face plate, guides on the face plate, a jaw movable on said guides, a gap in the back of said jaw, a screwed thrust member pivoted on said jaw, a nut threaded on said screwed member and adapted to slide in and out of said gap, racks on said face plate, dog pieces fixed on said nut adapted to engage said racks when the thrust member is swung down, abutments on the jaw and the locking member for opposing disengagement of said locking member from the face plate and opposing the tendency to flexure of the back of the jaw; the jaw being adjustable with reference to the locking member, both the to and fro adjustment of which jaw is positive with or directly controlled by the thrust member.

6. In a work or tool holder, a face plate, guides on said face plate, a jaw movable on said guides, a gap in the back of said jaw, a screwed member pivoted to said jaw, a nut threaded on said screwed member and adapted to slide in and out of said gap, racks on said face plate, dog-pieces on said member adapted to engage said racks and spring means for raising said nut when the latter is at the outer extremity of the gap.

In testimony whereof, I affix my signature.

HENRY BROOKER.